(12) United States Patent
Wagener

(10) Patent No.: US 8,319,106 B2
(45) Date of Patent: Nov. 27, 2012

(54) CARRYING DEVICE FOR BUSBARS

(75) Inventor: Hans Wagener, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 582 days.

(21) Appl. No.: 12/448,328

(22) PCT Filed: Dec. 15, 2007

(86) PCT No.: PCT/EP2007/011030
§ 371 (c)(1),
(2), (4) Date: Jun. 17, 2009

(87) PCT Pub. No.: WO2008/089826
PCT Pub. Date: Jul. 31, 2008

(65) Prior Publication Data
US 2010/0025078 A1    Feb. 4, 2010

(30) Foreign Application Priority Data

Jan. 26, 2007  (DE) .................. 10 2007 003 937

(51) Int. Cl.
*H01B 17/00* (2006.01)
(52) U.S. Cl. ........................................... 174/168
(58) Field of Classification Search .................... 174/168
See application file for complete search history.

(56) References Cited

U.S. PATENT DOCUMENTS

| | | | | |
|---|---|---|---|---|
| 2,318,859 | A * | 5/1943 | Huguelet | 248/68.1 |
| 4,199,070 | A * | 4/1980 | Magnussen, Jr. | 211/60.1 |
| 5,363,079 | A * | 11/1994 | Zawada et al. | 336/92 |
| 7,285,724 | B2 * | 10/2007 | Buettner | 174/70 B |

FOREIGN PATENT DOCUMENTS

| | | |
|---|---|---|
| AT | 276527 | 11/1969 |
| CH | 486 754 | 2/1970 |
| DE | 31 43 518 C3 | 5/1983 |
| DE | 41 25 604 A1 | 10/1992 |
| DE | 197 10 001 C2 | 9/1998 |
| EP | 0 589 775 A1 | 3/1994 |
| GB | 1 425 087 | 2/1976 |
| RU | 2 235 396 C2 | 8/2004 |
| RU | 2 025 013 C1 | 12/2004 |
| SU | 775809 | 10/1980 |

OTHER PUBLICATIONS

English Translation of Specification of EP0589775—Mar. 1994.*

* cited by examiner

*Primary Examiner* — Timothy Thompson
*Assistant Examiner* — Hiram E Gonzalez
(74) *Attorney, Agent, or Firm* — Pauley Petersen & Erickson

(57) ABSTRACT

A carrying device for busbars, having at least one holding device to be fixed on a base unit. The device has a receiving opening for feeding through at least one busbar, and a clamping device for fixing the same. Expanded installation possibilities of busbars result if there is a receiving part that is inserted, or that can be inserted, in the receiving opening. The part can have at least one recess that is adjusted to the cross-section of a busbar, and the respective busbar can be selectively disposed in the holding device in at least two installation positions pivoted about the longitudinal axes thereof, by the receiving part.

19 Claims, 9 Drawing Sheets

CARRYING DEVICE FOR BUSBARS

BACKGROUND OF THE INVENTION

1. Field of the Invention

This invention relates to a supporting device for busbars, having at least one holding device, which can be affixed to a base unit and having a receiving opening for feeding through at least one busbar and having a clamping device for affixing it in position.

2. Discussion of Related Art

A supporting device of this type is known from German Patent Reference DE 197 10 001 C2. In this known supporting device, a holding device fastens a busbar to a base unit embodied in the form of a cross-sectionally U-shaped supporting rail. The supporting rail is in turn attached by separate end pieces at both ends to frame legs or mounting rails in a frame or more precisely, a control box so that the corresponding rows of holes in the frame legs or mounting rails and the various attaching positions of the holding device on the supporting rail permit a wide variety of variable arrangement possibilities for the busbars. The holding devices are of a bridge piece, which is oriented toward the supporting rail, and side legs protruding at right angles from the bridge piece, thus producing a receiving opening, which is encompassed by a U-shape, for the insertion of a cross-sectionally square busbar that is fastened in the receiving opening of the holding device, which is composed of insulating material, by a bridge piece that is screw-mounted to the free end surfaces of the protruding side legs. Several busbars can be positioned on the supporting rail by holding devices situated next to one another in the longitudinal direction of the supporting rail.

SUMMARY OF THE INVENTION

One object of this invention is to provide a supporting device of the type mentioned above but that offers expanded positioning possibilities for busbars.

This object is attained with the defining characteristics taught in this specification and in the claims. The supporting device has a receiving component, which is or can be inserted into the receiving opening and has at least one opening adapted to the cross section of a busbar. With the receiving component, it is possible to selectively position the respective busbar in the holding device in at least two installation positions that are rotated in relation to each other around its longitudinal axis.

This design of the holding device achieves an adaptability to busbars of different cross sections and also permits different orientations of the at least one busbar accommodated in the receiving component. This significantly expands the number of possible installation variations of busbars in a busbar system. For example, a packeted group of cross-sectionally rectangular busbars can be positioned with their flat sides either parallel or perpendicular to the insertion direction into the holding device. For an insulated installation of the busbars, it is sufficient if the receiving component is of an insulating material such as plastic. The holding device can be comprised entirely or partially of metal or can itself be of an insulating material such as plastic.

Flexibility and simple installation of the busbars are facilitated by the receiving component embodied in a form of a separate part that can be removed from the holding device and the holding device contains holding elements that cooperate in a holding fashion with matching counterpart holding elements embodied on the receiving component to produce a uniquely defined positioning. For example, this makes it possible to insert different receiving components into the holding device and/or to affix a receiving component to one or more busbars before installation into the holding device and then to simply insert it together with each busbar into the holding device in a precisely positioned fashion. The holding elements can also be embodied in the form of guide elements with guide structures and the counterpart holding elements can be correspondingly embodied in the form of counterpart guide elements with complementary guide structures.

Other features that are advantageous for assembly and use include that the holding device is of a bottom piece and a top piece that can be detachably placed onto the bottom piece and clamped to it, between which the receiving opening is formed, and the receiving component can be removably inserted into the bottom piece and fixed in position by the top piece.

A simple, variable installation of at least one busbar in the holding device is facilitated by the fact that the receiving component can be positioned in the receiving opening in two installation positions that are rotated in relation to each other around the longitudinal axis of the busbar.

A simple construction and simple assembly are also facilitated by the receiving component being of two subcomponents, which can be assembled to each other, can accommodate at least one busbar between themselves, and can be attached to each other by connecting elements.

The use and simple construction are also facilitated by the connecting elements having cooperating insertion pins and pin sockets adapted thereto, detent elements and counterpart detent elements, a screw connection, or a combination of at least two of these different connection types.

If the at least one opening is adapted to a busbar with a rectangular cross section, then this offers a multitude of variable possible uses, with the busbars being simply constructed and easy to use. It is possible to account for a busbar of various cross-sectional shapes simply by adapting the openings to the different cross sections.

A simple use of the receiving components in various rotational positions is achieved by the receiving opening being surrounded by a circumferential contour, which is square in shape with rounded corners, and by the respective receiving component having a correspondingly adapted circumferential contour. The rounded corners produce an increased stability.

Another advantageous embodiment for construction and assembly has the bottom piece and top piece of the holding device with side legs oriented toward each other and the top piece is clamped to the bottom piece on both sides of the holding device by a screw connection passing through the opposing side legs, with the side legs of the bottom piece and the top piece being supported against each other.

Construction and assembly are also facilitated by a part of the screw connection being used to affix the bottom piece to the base unit.

For installation in a frame or a control box, the base unit advantageously has a supporting rail for accommodating the holding device.

BRIEF DESCRIPTION OF THE DRAWINGS

This invention is explained in greater detail in view of exemplary embodiments shown in the drawings, wherein.

DETAILED DESCRIPTION OF THE INVENTION

Figure 1:
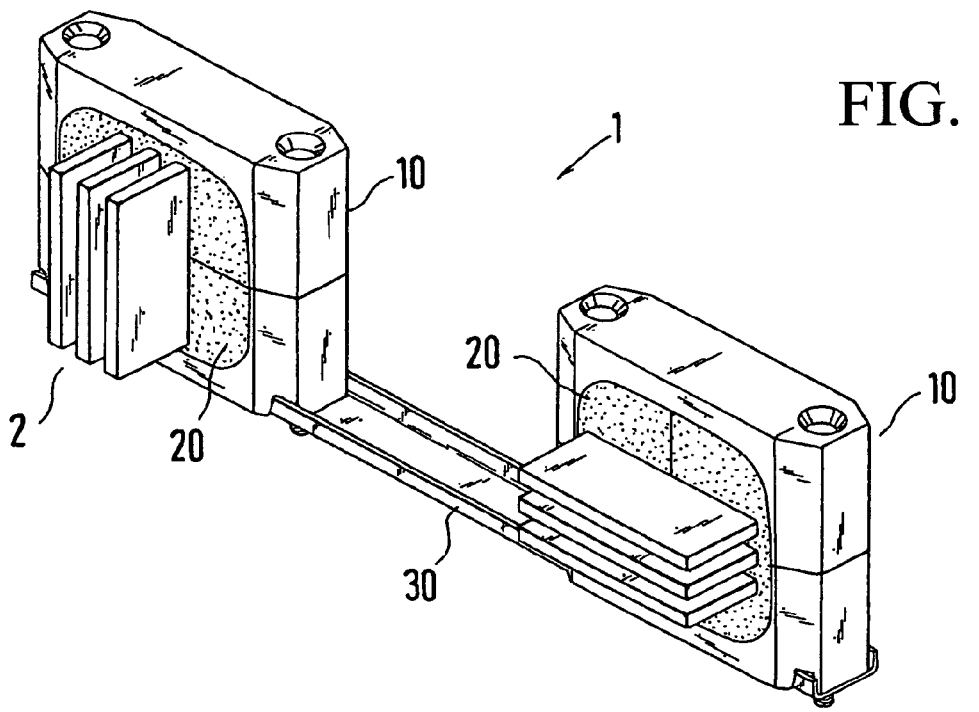
FIG. 1 is a perspective view of a supporting device with a supporting rail and two holding devices in which busbars are accommodated in different rotational positions around their longitudinal axes.
Figure 2:
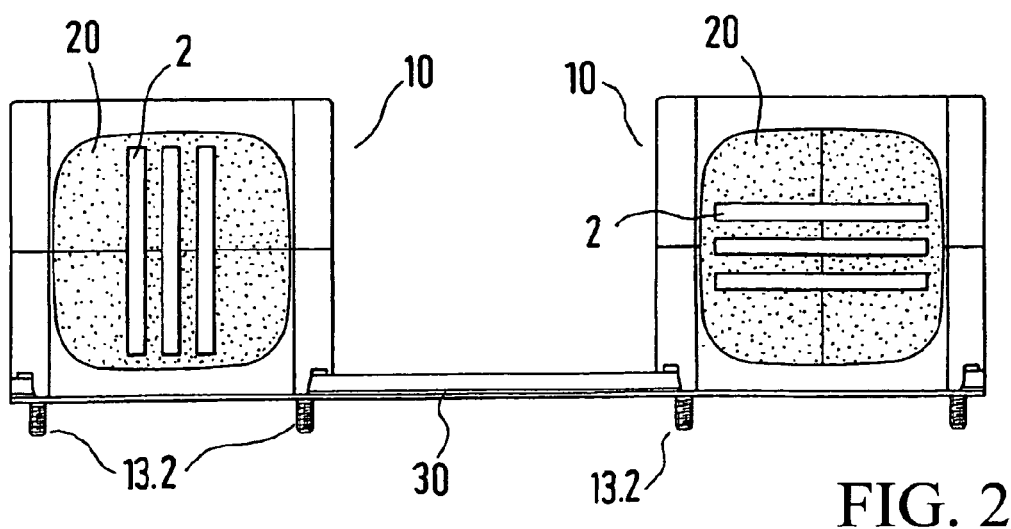
FIG. 2 is a front view of the supporting device according to FIG. 1.
Figure 3:
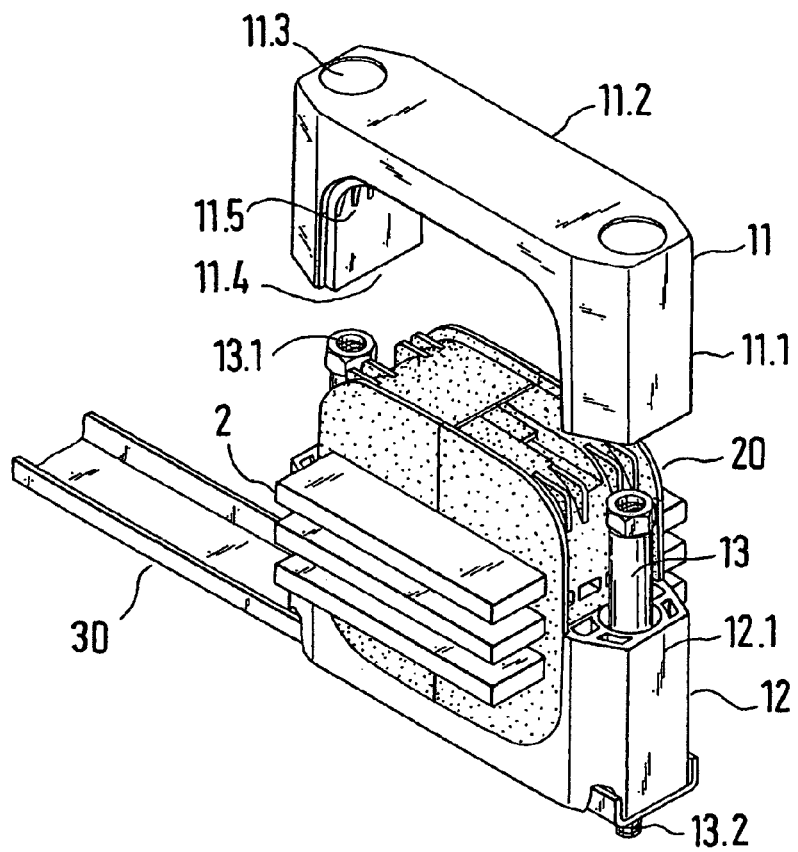
FIG. 3 is a perspective view of a detail of the supporting device according to FIG. 1, with an open holding device.
Figure 4:
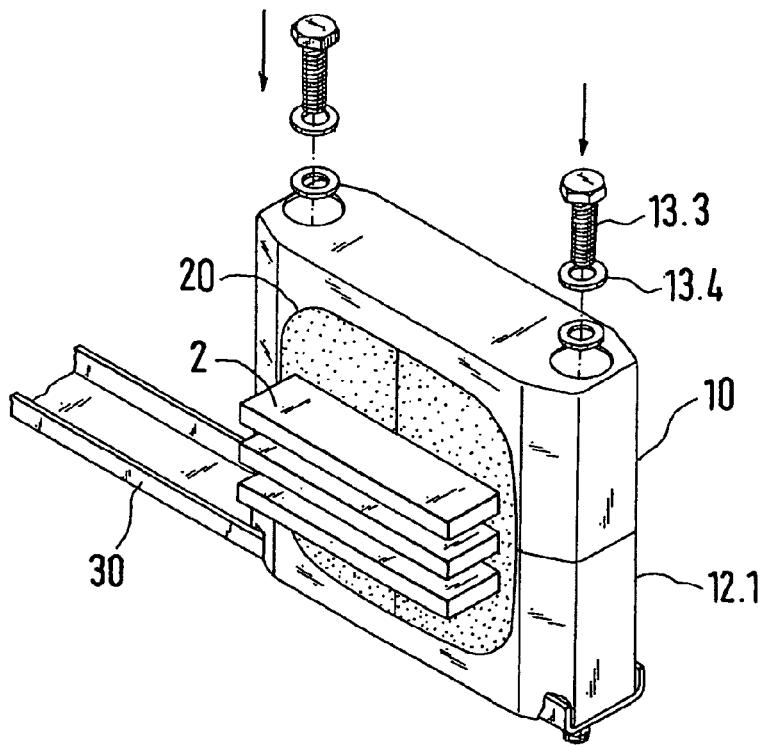
FIG. 4 shows a detail of the supporting device according to FIG. 1, with an assembled but not yet clamped holding device.
Figure 5:
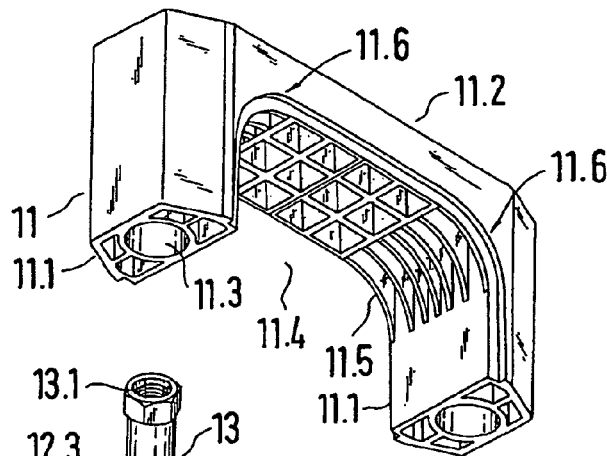
FIG. 5 is perspective view of the top piece of the holding device, viewed diagonally from below.

FIG. 1 shows an exemplary embodiment of a supporting device 1, having a base unit in the form of a U-shaped supporting rail 30 and two holding devices 10 mounted thereon, each of which accommodates a respective packet of three cross-sectionally rectangular busbars 2. To affix the busbars 2 in place, respective accommodating components 20 are inserted into a respective receiving opening 11.4, as shown in FIG. 3, and are fixed in position between a bottom piece 12 mounted on the supporting rail 30 and a top piece 11 clamped to the bottom piece. The receiving component 20 permits the busbars 2 to be inserted into the holding device 10 in different rotational positions in relation to their longitudinal axis and fixed in position therein, as shown in FIGS. 1 and 2.

Figure 6:
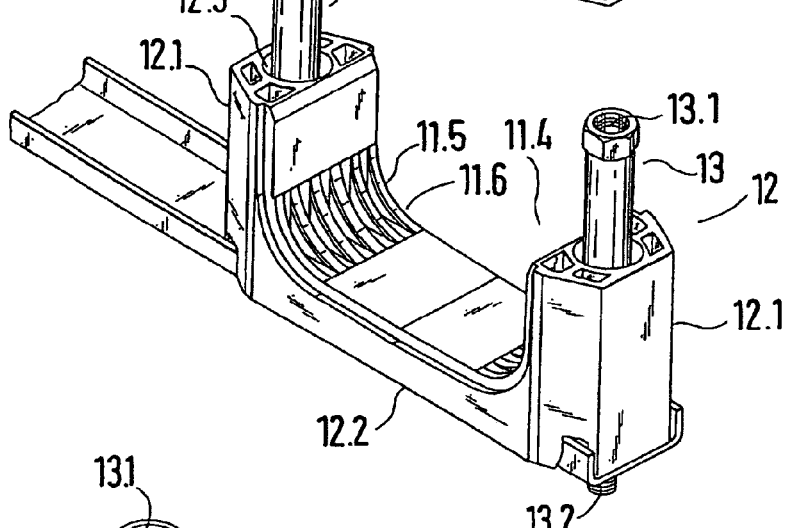
FIG. 6 is a perspective view of a detail of the supporting device according to FIG. 1, with a bottom piece of the holding device mounted on the supporting rail, viewed diagonally from above.
Figure 7:
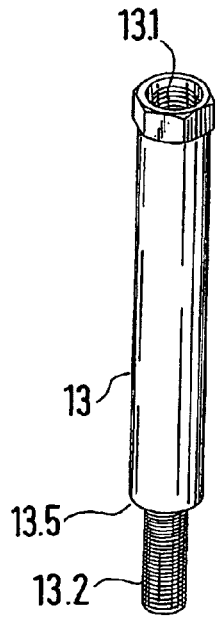
FIG. 7 shows a bolt of the holding device.
Figure 8:
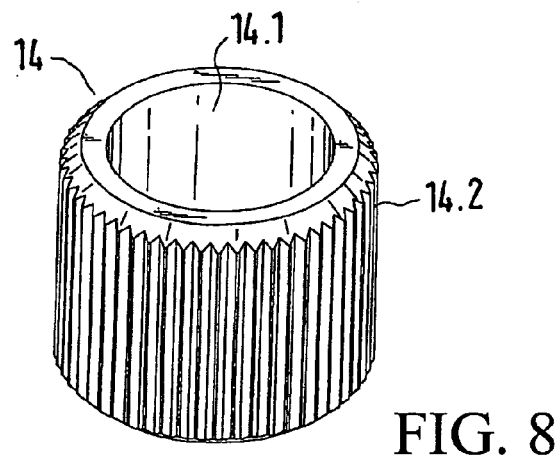
FIG. 8 shows a metal bushing that is cast into the bottom piece of the holding device.
Figure 9:
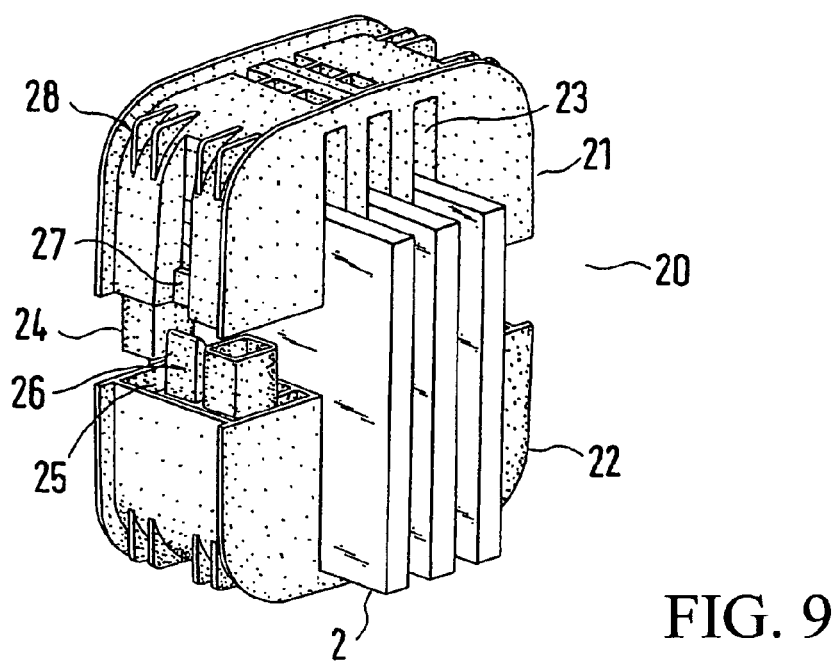
FIG. 9 is a perspective view of a receiving component that can be inserted into a holding device, with busbars accommodated in it, in a partially open state.
Figure 10:
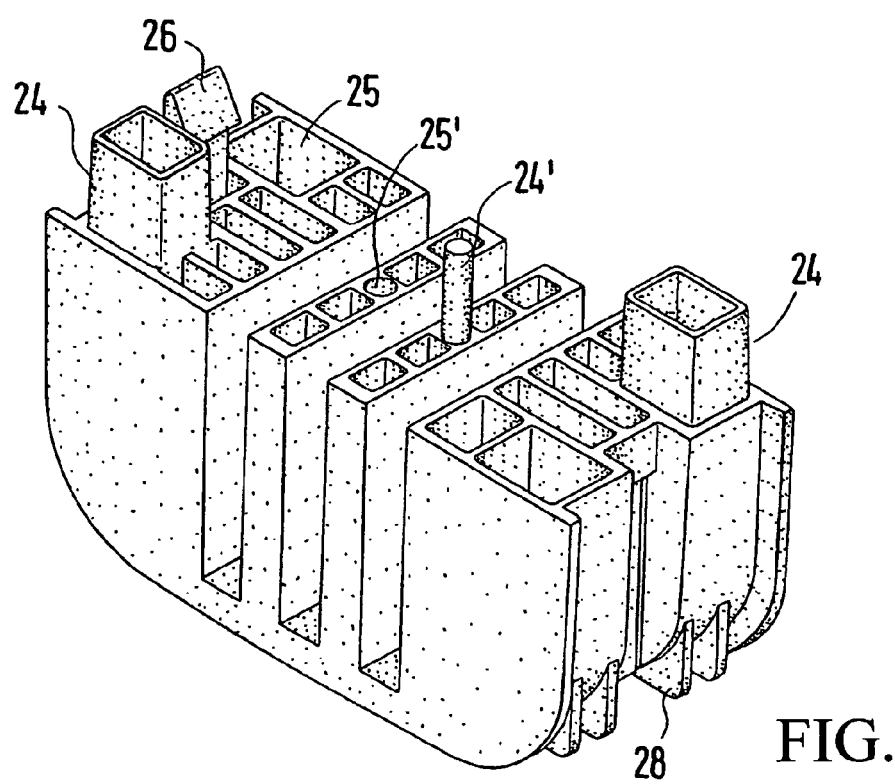
FIG. 10 is a perspective view of a subcomponent of the receiving component according to FIG. 9.
Figure 11:
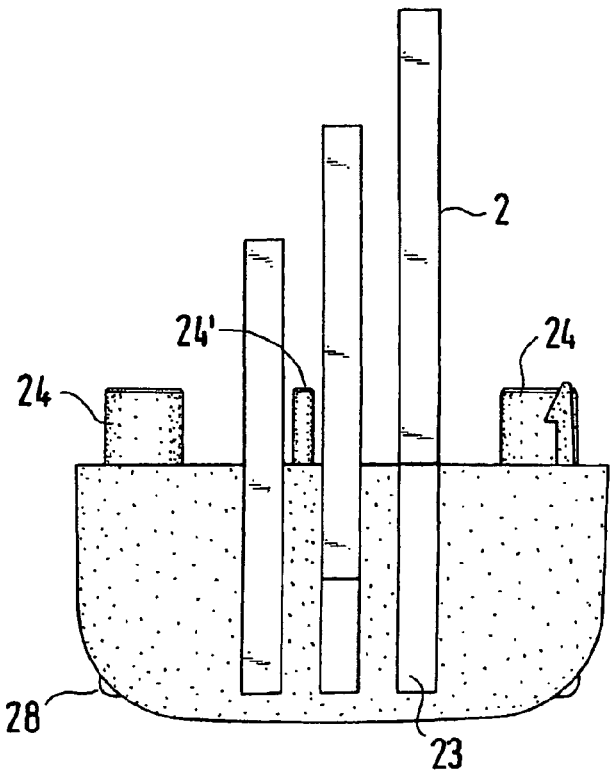
FIG. 11 is a front view of a subcomponent of the receiving component, with partially inserted busbars.
Figure 12:
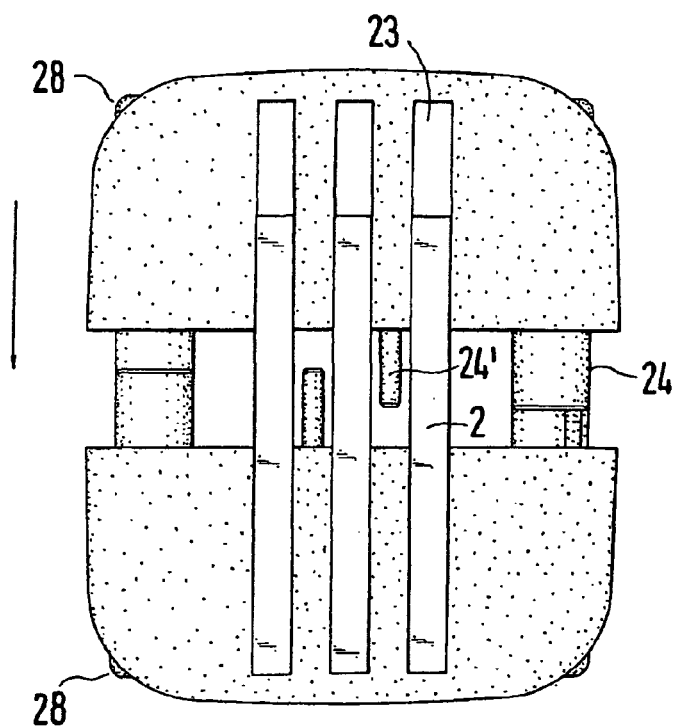
FIG. 12 is a front view of the receiving component according to FIG. 9 with inserted busbars, in a partially open state.

The bottom piece 12 is mounted to the supporting rail 30, as disclosed in German Patent Reference DE 197 10 001 C2 mentioned at the beginning, by threaded bolts 13, as shown in FIG. 7, that are guided perpendicular to the plane of the supporting rail 30 through fastening openings 12.3 in side legs 12.1 of the bottom piece 12 and screwed into threaded openings in the supporting rail 30 by threaded pins 13.2 embodied on the mounting bolts 13. The threaded pins 13.2 have a smaller diameter than the remaining part of the threaded bolt 13, forming a shoulder 13.5 that cooperates with an associated shoulder in the fastening opening 12.3 of the associated side leg 12.1 of the bottom piece 12. Thus, a metal bushing 14, as shown in FIG. 8, is cast into the fastening opening 12.3 and fastened by a securing outer structure 14.2 with an inner cylinder 14.1 that has a larger diameter than the threaded pin 13.2, but a smaller diameter than the remaining section of the threaded bolt 13. This produces a stable fixing of the bottom piece 12 on the supporting rail 30, with the metal bushing 14 serving as a support against the facing surface of the supporting rail 30 and also as a support against the shoulder 13.5 so that there is no distortion of the bottom piece 12, the remainder of which is of insulating material, in particular plastic. The bottom piece 12, on the side of its bridge piece 12.2 oriented toward the supporting rail 30, has longitudinally extending lateral grooves that are adapted to the side legs of the U-shaped supporting rail 30 and accommodate them, as shown in FIG. 6 and also in FIGS. 1 and 2.

As shown in FIGS. 3, 4, 5, 6, and 7, the end section of the threaded bolts oriented away from the threaded pin 13.2 has a threaded bore 13.1 into which fastening screws 13.3 can be screwed in order to affix the top piece 11 of the holding device 10. The fastening screws 13.3 are inserted through fastening openings 11.3 of the side legs 11.1 protruding from either side of the top piece 11 and in the assembled state are aligned with the fastening openings 12.3 in the side legs 12.1 of the bottom piece 12. The top piece 11 is secured to the bottom piece 12 by the screw heads of the fastening screws 13.3 and flat washers inserted under them.

When the top piece 11 is clamped to the bottom piece 12, the receiving component 20 inserted into the receiving opening 11.4 between the bottom piece 12 and the top piece 11 of the holding device 10 is secured in the holding device 10 in a stable fashion and is also prevented from sliding out in the longitudinal direction of the busbars 2. The rounded corner regions of the receiving opening 11.4 are equipped with holding elements 11.5 and the counterpart holding elements 28 are embodied in the likewise rounded corner regions of the receiving component 12 and can also have a guiding function in order to facilitate insertion. The rounded regions 11.6 between the side legs 11.1 and the bridge piece 11.2 of the top piece 11 and between the side legs 12.1 and the bridge piece 12.2 of the bottom piece 12 produce a high degree of stability by preventing stress concentration. In particular, the holding and guiding elements 11.5 are embodied as insertion slots situated between wall elements and conversely, the counterpart holding and guiding elements 28 are embodied as insertion elements adapted to the insertion slots, with slots situated between them so that the receiving components 20 can be easily inserted into the respective bottom piece 12. This permits the top piece 11 to be easily placed onto the receiving component 20 in a uniquely defined position, with the receiving component 20 also being securely fastened between the bottom piece 12 and the top piece 11 in the longitudinal direction of the busbars 2 in the clamped state.

The receiving opening 11.4 and the receiving component 20 are adapted to each other in their circumferential contour so that the receiving component 20 can be inserted in two rotational positions, one rotated by 90° and the other rotated by 90° more in relation to the longitudinal axis of the busbars, as shown in FIGS. 1 and 2. In the holding device 10 shown on the right, the receiving component 20 is inserted in a position in which the cross-sectionally rectangular busbars 2 extend parallel to the plane of the supporting rail 30, while in the holding device 10 shown on the left, the receiving component 20 is inserted into the holding device 10 in a position in which the cross-sectionally rectangular busbars 2 are oriented perpendicular to the plane of the supporting rail 30.

For the insertion of the busbars 2, openings 23 that are each adapted to the respective cross sections of the busbars, such as rectangular openings in this instance, are provided in the receiving component 20, as also particularly shown in FIGS. 9, 10, 11, and 12. The openings 23 here, whose cross-sectional contour corresponds to that of the busbars 2, are composed of cross-sectionally rectangular slots that are oriented parallel to one another and are separated from one another by intermediate walls. The thickness of the intermediate walls corresponds to the thickness of the busbars 2 so that between the busbars 2, which extend with their flat sides parallel to one another, intermediate spaces are produced outside of the receiving component 20, extending the length of the busbars 2 and dimensionally corresponding to both the width and thickness of the busbars 2. Rail sections of the same thickness as the busbars can be inserted into the intermediate spaces and fixed in position therein in order to connect to other busbars 2, for example extending at right angles to the longitudinal direction of the busbars 2. It is also possible for flat connecting pieces bent into an L-shape or a Z-shape to be inserted into these intermediate spaces so that the receiving components 20 advantageously supplement a continuous system of busbars with reliable, electrically conductive connections. The slots between the busbars also constitute or form flow conduits for good ventilation, making it possible, for example, to take advantage of a chimney effect achieved in a control box.

As also shown in FIGS. 9 through 12, the receiving components 20 are composed of two subcomponents 21, 22 that are advantageously identically embodied and can be detachably connected to each other by detent elements 26 and counterpart detent elements 27 or alternatively by means of screw connections. In addition, for simple assembly of the two subcomponents 21, 22 insertion pins 24 on the one hand and appropriately adapted pin sockets 25 on the other hand are formed into the parting plane of the two subcomponents and additional insertion pins 24' and correspondingly adapted pin sockets 25' can be formed onto and into them in order to provide stability and simplify assembly.

In the exemplary embodiment shown, in the region of its one narrow side, the respective cross-sectionally rectangular subcomponent 21 and 22 has a detent element 26 in the form of a detent projection equipped with a detent bevel extending in the insertion direction and a detent shoulder acting in the direction opposite from the insertion direction, while in the region of or near its other narrow side, it has a lateral recess with a detent element functioning as a counterpart detent element 27, which cooperates with the detent shoulder. In the diagonally opposite corner regions of the parting plane, cross-sectionally rectangular insertion pins 24 are provided and in the region of the two other diagonally opposite corner regions of the parting plane, the pin sockets 25 are provided, which are embodied in the form of recesses and are correspondingly adapted to the insertion pins 24. In the middle of a dividing wall between the openings 23, a cross-sectionally round insertion pin is embodied as an additional insertion pin 24' and a round recess adapted thereto is provided in the region of or near the middle of the other dividing wall and embodied in the form of an additional pin socket 25'. With this embodiment, the two identically embodied subcomponents 21, 22 can be plugged into each other in a position in which they are rotated by 180° in relation to each other around the longitudinal axis of an inserted busbar and can engage each other in detent fashion. The subcomponents 21, 22 can thus be easily slid, for example onto a packet of three parallel, spaced-apart, cross-sectionally rectangular busbars 2, at the opposing narrow edges of the latter, and be connected to each other so that they encompass the busbars 2. In this case, the connection is embodied so that the receiving components 20 that have been assembled around the packet of busbars 2 can still be slid in the longitudinal direction if necessary. The receiving component 20 or several receiving components 20 spaced apart from one another in the longitudinal direction of the busbars 2 can thus be easily inserted into corresponding holding devices 10 and clamped into them in the manner described above. The busbars can thus be easily installed in the two positions that are rotated by 90° in relation to each other around their longitudinal axes.

FIGS. 13A through 13D show various installation situations of the supporting device in a frame 3 of a control box or rack. In the embodiment according to FIGS. 13A and 13B, the supporting device is positioned in the vertical region of the frame 3. Two holding devices 10 are mounted onto a base unit in the form of a mounting plate 30' and the receiving component 20 is inserted into the holding device 10, with a horizontal orientation of the flat sides of the horizontally extending busbars 2. The upper left figure is a top view of the frame with the supporting device, viewed along the intersecting plane A-A, the lower left depiction is a front view of the frame 3 with the supporting device, and the depiction on the right is a side view of the frame 3, looking toward the end surface of the busbars 2. By contrast with FIG. 13A, in the depiction in FIG. 13B, the receiving components 20 with the busbars 2 are inserted into the holding device 10 so that the horizontally extending busbars 2 are oriented with their flat sides vertically.

Figure 13A:
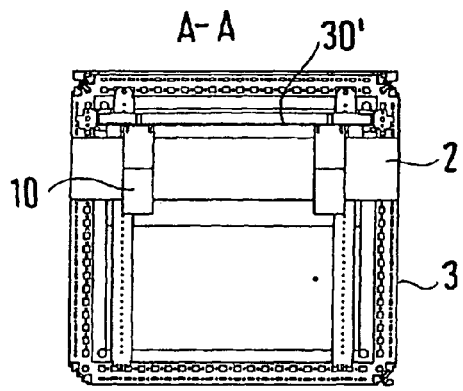
FIGS. 13A through 13D show various installation situations of the supporting device.
Figure 13A:
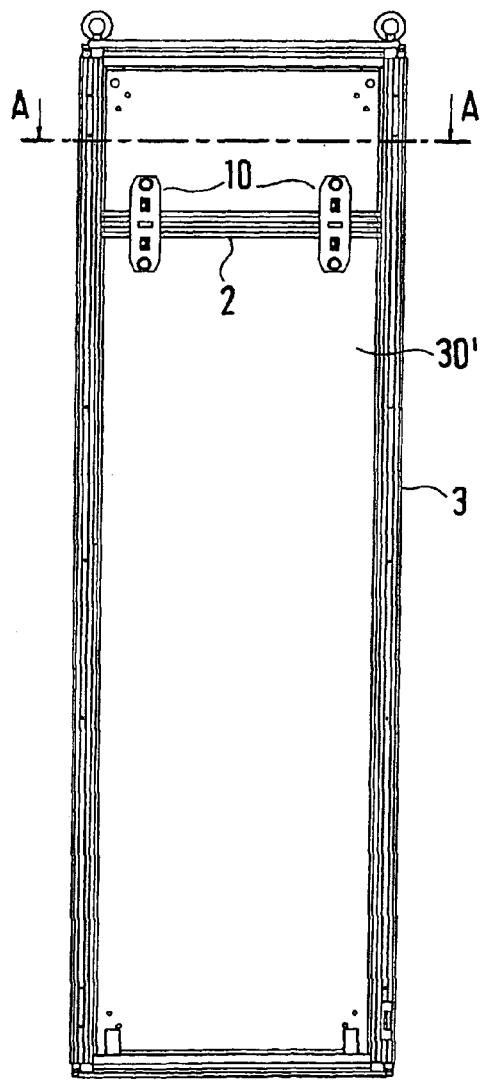
Figure 13A:
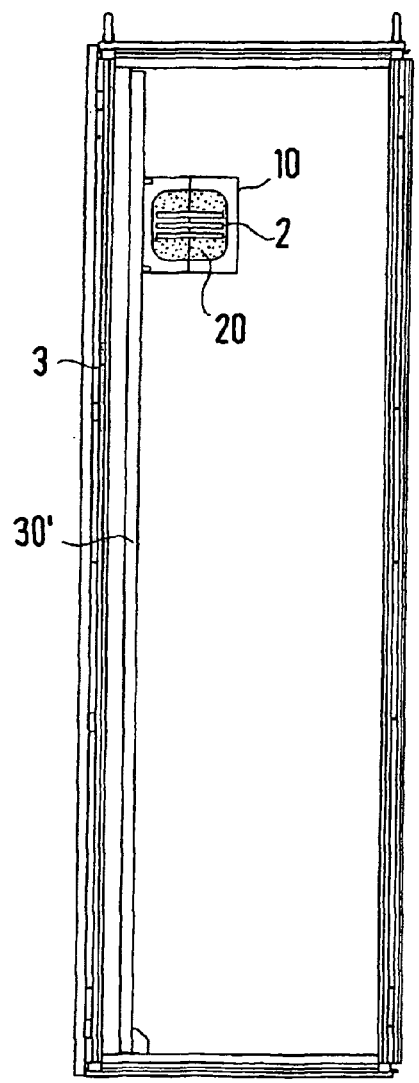
Figure 13B:
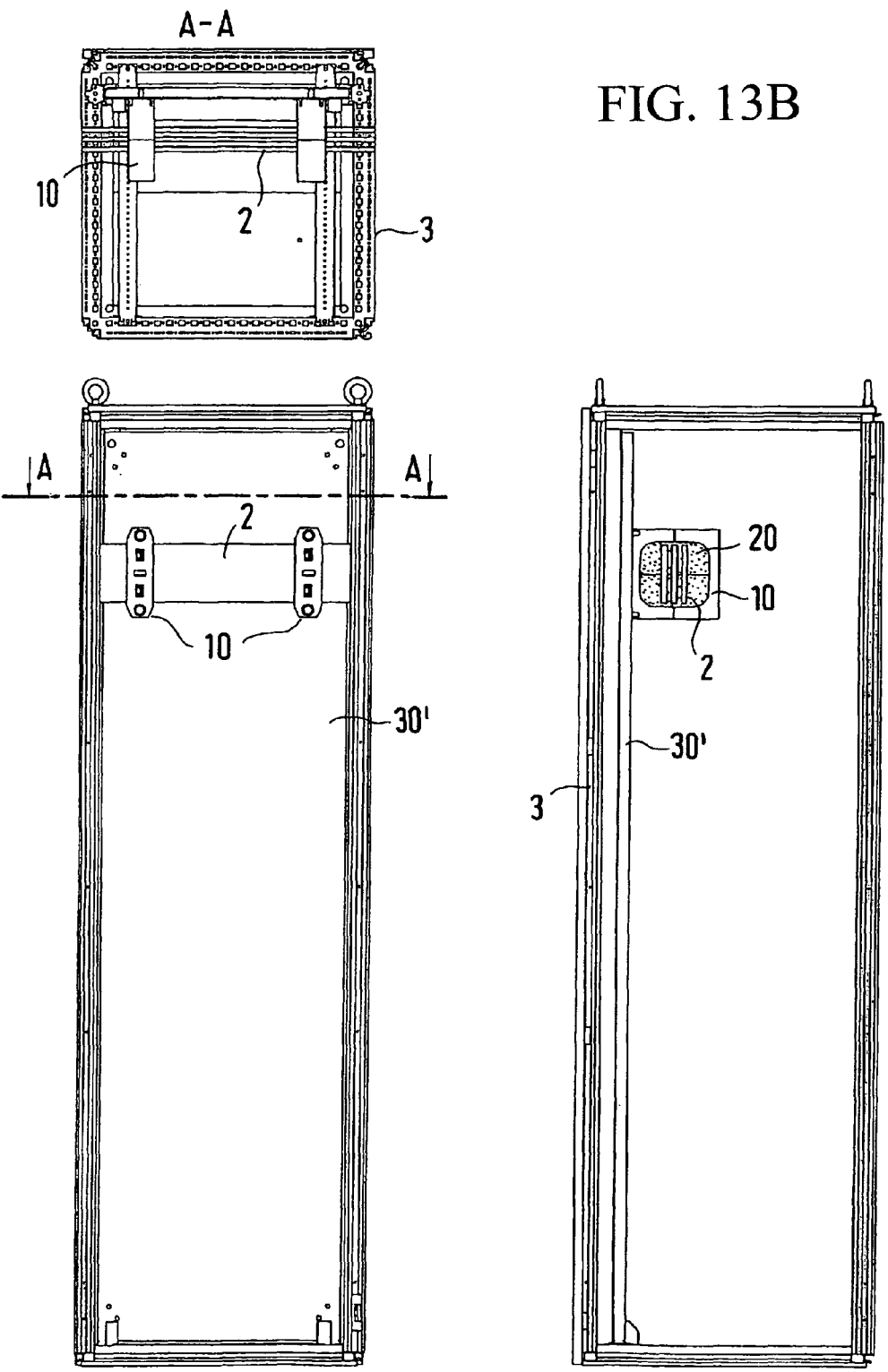
Figure 13C:
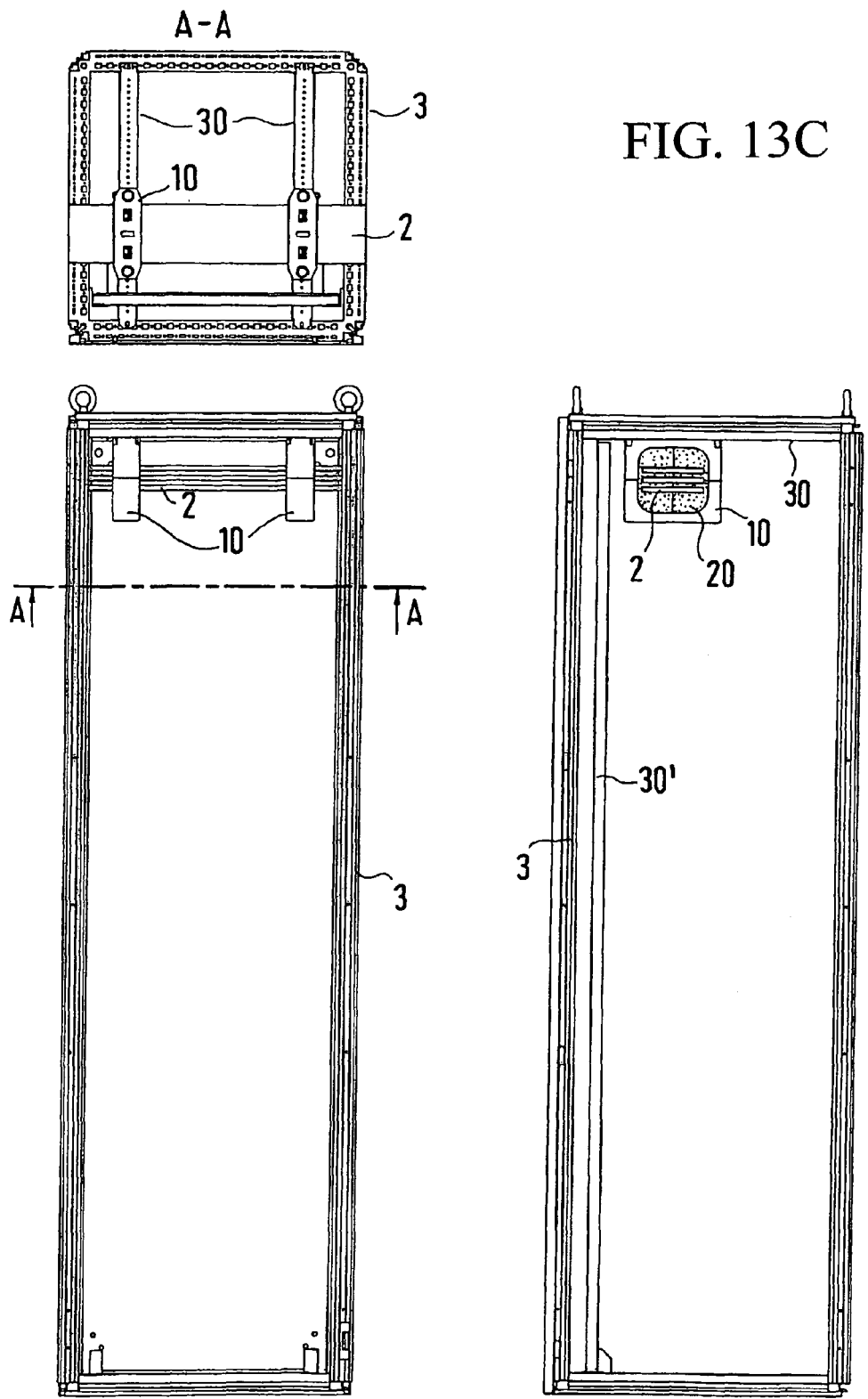
Figure 13D:
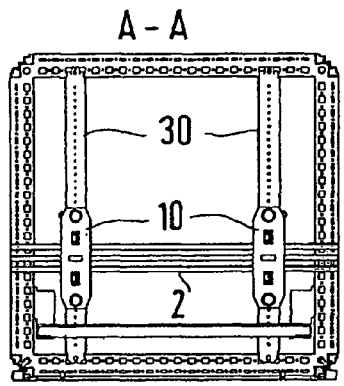
Figure 13D:
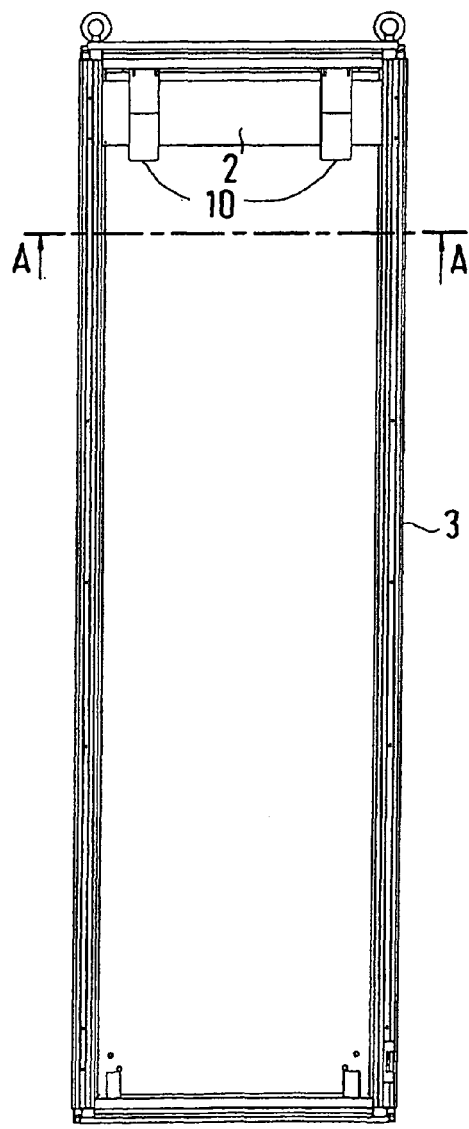
Figure 13D:
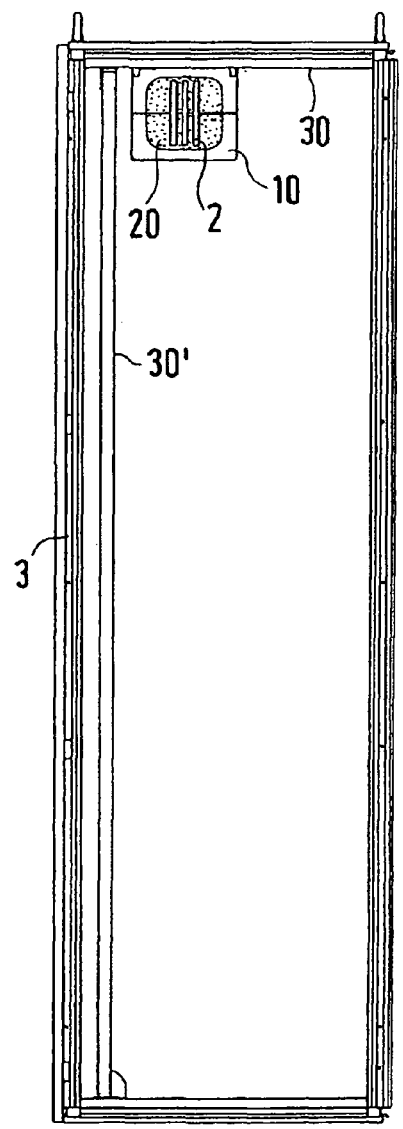

In the embodiment according to FIG. 13C, the busbars 2 likewise extend horizontally, but are mounted by horizontal supporting rails 30 in the roof region of the frame 3. Two holding devices 10 are used, which are mounted to the underside of the supporting rails 30, protruding downward from them. In this instance, the receiving components 20 with the busbars 2 are inserted into the holding device 10 so that the busbars 2 are oriented with their flat sides horizontally. In this case, the top left depiction is a bottom view of the frame 3 with the supporting device, the lower left depiction is a front view of the frame 3 and supporting device, and the depiction on the right is a side view of the frame 3 with the supporting device. By contrast with the FIG. 13C, in the embodiment according to FIG. 13D, the receiving components 20 with the busbars 2 are inserted into the holding device 10 with the flat side of the busbars 2 oriented vertically. Otherwise, this design corresponds to the one in FIG. 13C.

Other rotational positions for other installation positions can also be provided. It is also possible to produce other installation positions if the openings 23 are situated off-center in the receiving component 20. With the aid of different receiving components 20, it is possible to accommodate busbars with different cross-sectional shapes. It is also possible for there to be an embodiment in which the receiving component can be inserted in two installation positions around at least one busbar, wherein the positions are rotated by 180° in relation to each other perpendicular to the longitudinal axis of the busbar.

The invention claimed is:

1. A supporting device for busbars, having at least one holding device (10), which can be affixed to a base unit and having a receiving opening (11.4) for feeding through at least one busbar (2) and having a clamping device for affixing it in position, the supporting device comprising:
  a receiving component (20) inserted or insertable into the receiving opening (11.4) and having at least one opening (23) adapted to a cross section of the busbar (2), and the receiving component (20) selectively positioning the respective busbar (2) in the holding device (10) in at least two installation positions that are rotated in relation to each other around a longitudinal axis;
  wherein the receiving component (20) is formed as a separate part that can be removed from the holding device (10) and the holding device (10) contains holding elements (11.5) at each of the corner regions of the holding device (10) that cooperate in a holding fashion with matching counterpart holding elements (28) at each of the corner regions of the receiving component (20), wherein each of the insertion elements is inserted or insertable with a matching one of the insertion slots in order to produce a uniquely defined positioning and to prevent the receiving component (20) from sliding out of the holding device (10) in a longitudinal direction of the busbars (2); and the holding device (10) including a bottom piece (12) and a top piece (11) that can be detachably placed onto the bottom piece and clamped to it, between which the receiving opening (11.4) is formed and the receiving component (20) can be removably inserted into the bottom piece (12) and fixed in position by the top piece (11).

2. A supporting device for busbars, comprising:

a holding device (10), which can be affixed to a base unit and having a receiving opening (11.4) for feeding through busbars (2);

a receiving component (20) formed as a separate part from the holding device and inserted or insertable into the receiving opening (11.4), and including two openings (23) each adapted to, and receiving, a cross section of one of the busbars (2), and the receiving component (20) selectively positioning the busbars (2) in the holding device (10) in at least two installation positions that are rotated in relation to each other around a longitudinal axis;

holding elements (11.5) comprising a plurality of parallel insertion slots disposed at each corner region of the holding device (10), each of the insertion slots separated from an adjacent insertion slot by a wall element;

counterpart holding elements (28) comprising a plurality of parallel insertion elements extending from each corner region of the receiving component (20), wherein each of the insertion elements is spaced apart from an adjacent insertion elements and is inserted or insertable into a matching one of the insertion slots, wherein the inserted insertion elements produce a defined positioning and prevent the receiving component (20) from sliding out of the holding device (10) in a longitudinal direction of the busbars (2).

3. The supporting device as recited in claim 2, wherein the holding device (10) is of a bottom piece (12) and a top piece (11) that can be detachably placed onto the bottom piece and clamped to it, between which the receiving opening (11.4) is formed and the receiving component (20) can be removably inserted into the bottom piece (12) and fixed in position by the top piece (11).

4. The supporting device as recited in claim 1, wherein the receiving component (20) can be positioned in the receiving opening (11.4) in two installation positions rotated in relation to each other around the longitudinal axis of the busbar.

5. The supporting device as recited in claim 4, wherein the receiving component (20) is of two subcomponents (21, 22) that can be assembled to each other, can accommodate at least one busbar (2) between themselves, and can be attached to each other by connecting elements.

6. The supporting device as recited in claim 5, wherein the connecting elements have cooperating insertion pins (24) and adapted pin sockets (25), detent elements (26) and counterpart detent elements (27), a screw connection, or a combination of at least two of these different connection types.

7. The supporting device as recited in claim 6, wherein the at least one opening (23) is adapted to a busbar (2) with a rectangular cross section.

8. The supporting device as recited in claim 7, wherein the receiving opening (11.4) is surrounded by a circumferential contour which is square in shape with rounded corners, and the respective receiving component (20) has a correspondingly adapted circumferential contour.

9. The supporting device as recited in claim 8, wherein the bottom piece (12) and the top piece (11) of the holding device (10) have side legs (11.1; 12.1) oriented toward each other and the top piece (11) is clamped to the bottom piece (12) on both sides of the holding device (10) by a screw connection passing through the opposing side legs (11.1; 12.1), with the side legs (11.1; 12.1) of the bottom piece (12) and the top piece (11) supported against each other.

10. The supporting device as recited in claim 9, wherein a part of the screw connection affixes the bottom piece (12) to the base unit (10).

11. The supporting device as recited in claim 10, wherein the base unit has a supporting rail (30) or a mounting plate (30') for accommodating the holding device (10).

12. The supporting device as recited in claim 1, wherein the receiving component (20) can be positioned in the receiving opening (11.4) in two installation positions rotated in relation to each other around the longitudinal axis of the busbar.

13. The supporting device as recited in claim 1, wherein the receiving component (20) is of two subcomponents (21, 22) that can be assembled to each other, can accommodate at least one busbar (2) between themselves, and can be attached to each other by connecting elements.

14. The supporting device as recited in claim 13, wherein the connecting elements have cooperating insertion pins (24) and adapted pin sockets (25), detent elements (26) and counterpart detent elements (27), a screw connection, or a combination of at least two of these different connection types.

15. The supporting device as recited in claim 1, wherein the at least one opening (23) is adapted to a busbar (2) with a rectangular cross section.

16. The supporting device as recited in claim 1, wherein the receiving opening (11.4) is surrounded by a circumferential contour which is square in shape with rounded corners, and the respective receiving component (20) has a correspondingly adapted circumferential contour.

17. The supporting device as recited in claim 3, wherein the bottom piece (12) and the top piece (11) of the holding device (10) have side legs (11.1; 12.1) oriented toward each other and the top piece (11) is clamped to the bottom piece (12) on both sides of the holding device (10) by a screw connection passing through the opposing side legs (11.1; 12.1), with the side legs (11.1; 12.1) of the bottom piece (12) and the top piece (11) supported against each other.

18. The supporting device as recited in claim 17, wherein a part of the screw connection affixes the bottom piece (12) to the base unit (10).

19. The supporting device as recited in claim 1, wherein the base unit has a supporting rail (30) or a mounting plate (30') for accommodating the holding device (10).

* * * * *